United States Patent [19]
Weder et al.

[11] Patent Number: 5,680,740
[45] Date of Patent: *Oct. 28, 1997

[54] METHOD OF USING A WRAPPING MATERIAL HAVING A PULL TAB AND PULL INDICIA FOR WRAPPING A FLORAL ARRANGEMENT

[75] Inventors: Donald E. Weder; Joseph G. Straeter, both of Highland; William F. Straeter, Breese, all of Ill.

[73] Assignee: Southpac Trust International, Inc., Oklahoma City, Okla.; not individually, but as trustee of The Family Trust U/T/A dated December 8, 1995, Charles A. Codding, Authorized Signatory for Southpac Trust International, Inc. trustee

[*] Notice: The term of this patent shall not extend beyond the expiration date of Pat. No. 5,428,939.

[21] Appl. No.: 457,956

[22] Filed: Jun. 1, 1995

Related U.S. Application Data

[63] Continuation of Ser. No. 93,838, Jul. 19, 1993, Pat. No. 5,467,573, which is a continuation-in-part of Ser. No. 963,882, Oct. 20, 1992, Pat. No. 5,408,803, which is a continuation-in-part of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 93,822, is a continuation-in-part of Ser. No. 893,586, Jun. 2, 1992, Pat. No. 5,181,634, which is a continuation of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, and Ser. No. 249,761, Sep. 26, 1988, abandoned.

[51] Int. Cl.[6] ............................. B65B 11/02; B65B 11/48; B65B 51/04; B65B 25/02
[52] U.S. Cl. ..................... 53/397; 53/399; 53/412; 53/465
[58] Field of Search ............................ 53/397, 399, 412, 53/415, 419, 461, 462, 465; 206/423

[56] References Cited

U.S. PATENT DOCUMENTS

| | | | |
|---|---|---|---|
| 809,299 | 1/1906 | Henke et al. | |
| 2,170,147 | 8/1939 | Lane | 286/56 |
| 2,371,985 | 3/1945 | Freiberg | 206/46 |
| 3,271,922 | 9/1966 | Wallerstein et al. | 53/3 |
| 3,273,302 | 9/1966 | Walter | 53/39 |
| 3,403,840 | 10/1968 | Mathes | 229/51 |
| 3,508,372 | 4/1970 | Wallerstein et al. | 53/3 |
| 4,765,464 | 8/1988 | Ristvedt | 206/0.82 |
| 4,801,014 | 1/1989 | Meadows | 206/423 |
| 5,111,638 | 5/1992 | Weder | 53/397 |
| 5,205,108 | 4/1993 | Weder et al. | 53/397 |
| 5,307,605 | 5/1994 | Straeter | 53/397 |
| 5,335,475 | 8/1994 | Weder et al. | 53/397 |
| 5,335,476 | 8/1994 | Weder | 53/397 |
| 5,335,477 | 8/1994 | Weder | 53/399 |
| 5,339,601 | 8/1994 | Weder et al. | 53/397 |
| 5,353,575 | 10/1994 | Stepanek | 53/461 |
| 5,373,942 | 12/1994 | Weder | 53/419 X |
| 5,428,939 | 7/1995 | Weder et al. | 53/397 |
| 5,467,573 | 11/1995 | Weder et al. | 53/465 X |

FOREIGN PATENT DOCUMENTS 9315979   9/1992   WIPO .

Primary Examiner—Horace M. Culver
Attorney, Agent, or Firm—Dunlap & Codding, P.C.

[57] ABSTRACT

A method for both wrapping a floral arrangement and removing the wrapping material from the floral arrangement, comprising a sheet of material having a pull tab and pull indicia thereon, the pull tab sized to be easily graspable, a bonding material disposed on the sheet of material near the pull tab. A floral arrangement is utilized, the floral arrangement being wrapped in the sheet of material, the sheet of material being crimped about a portion of the floral arrangement.

26 Claims, 7 Drawing Sheets

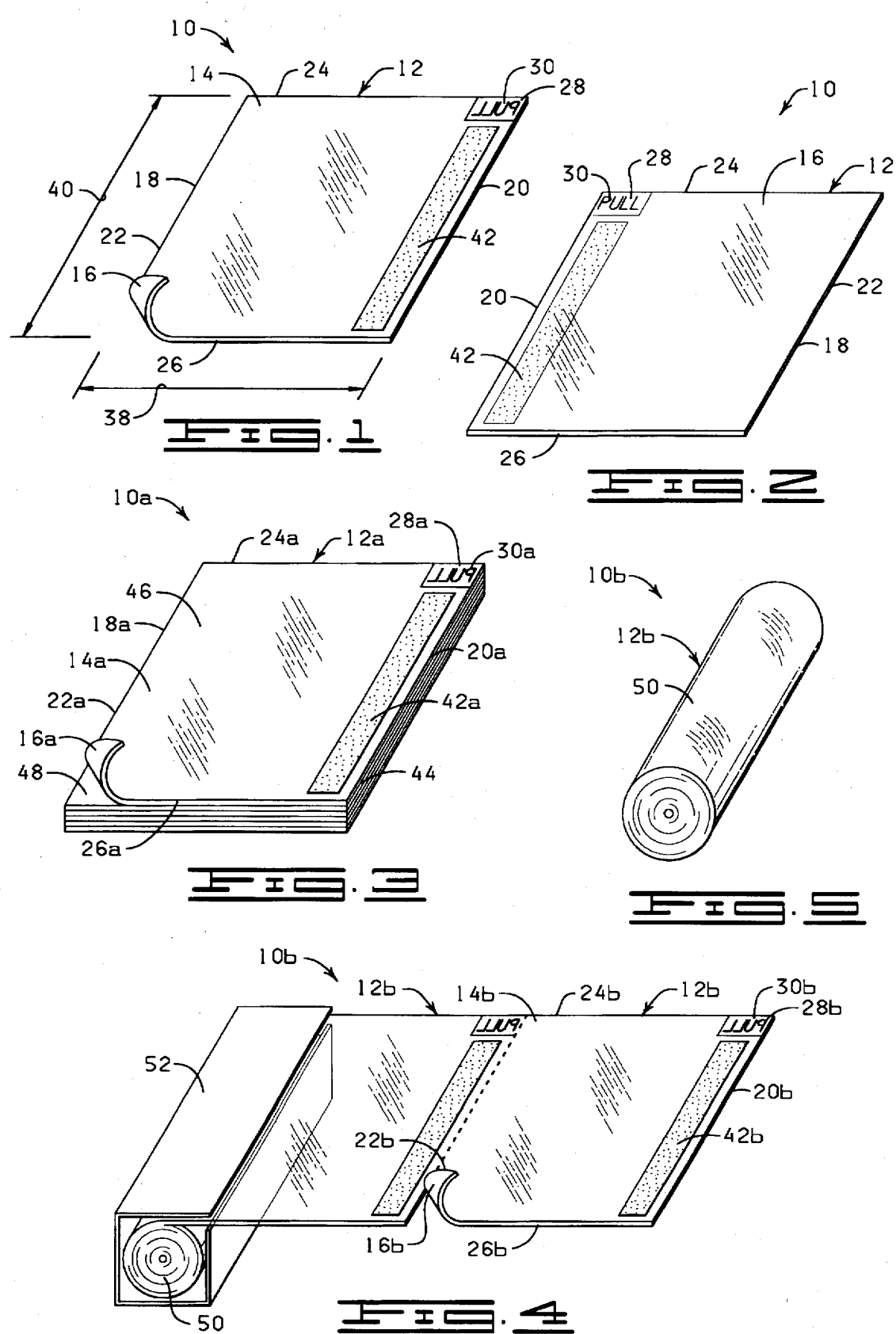

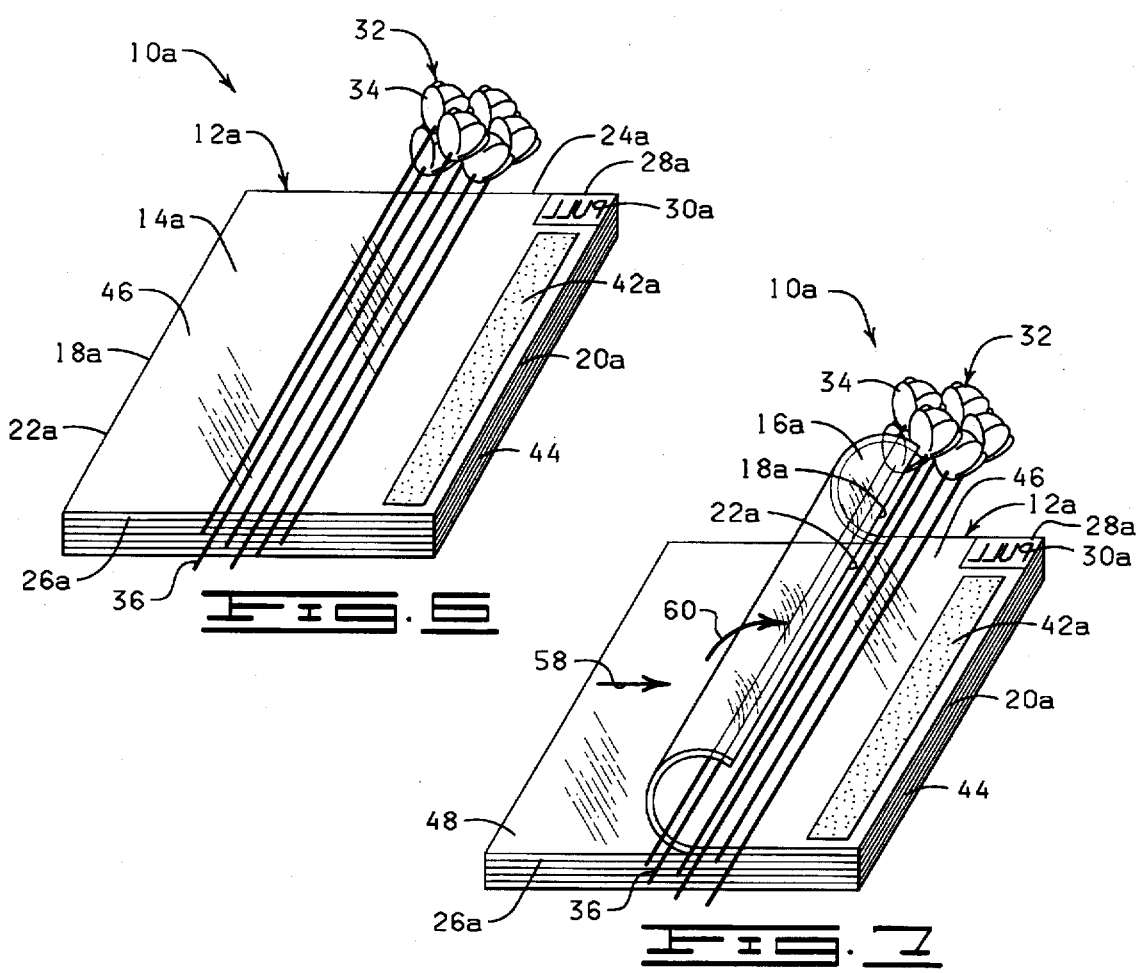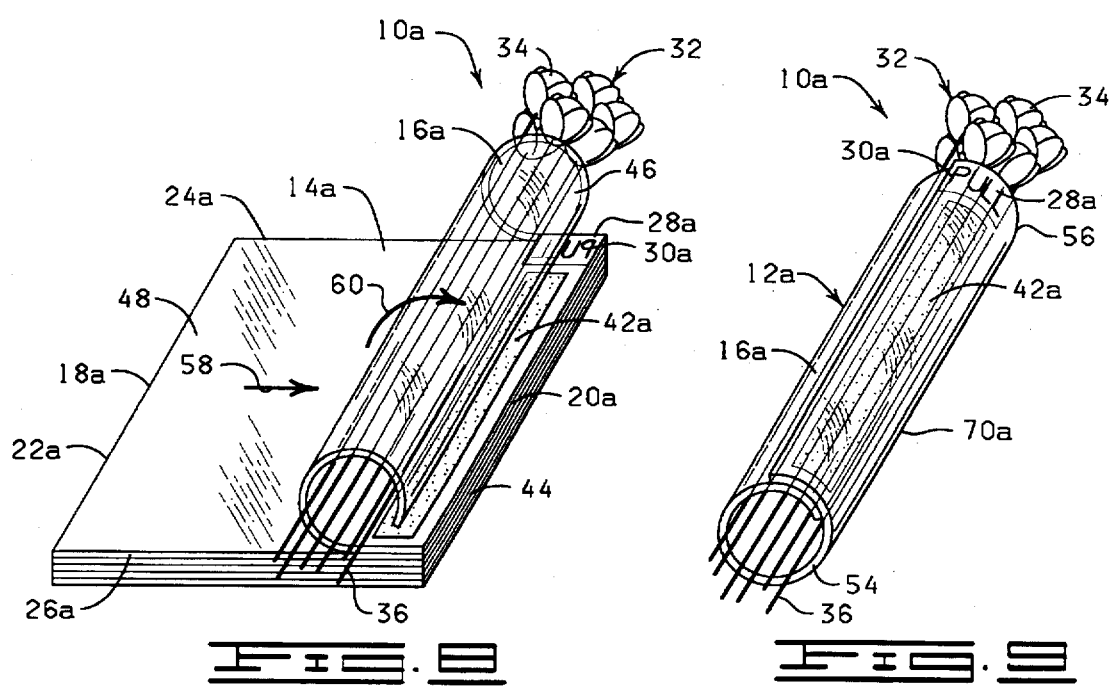

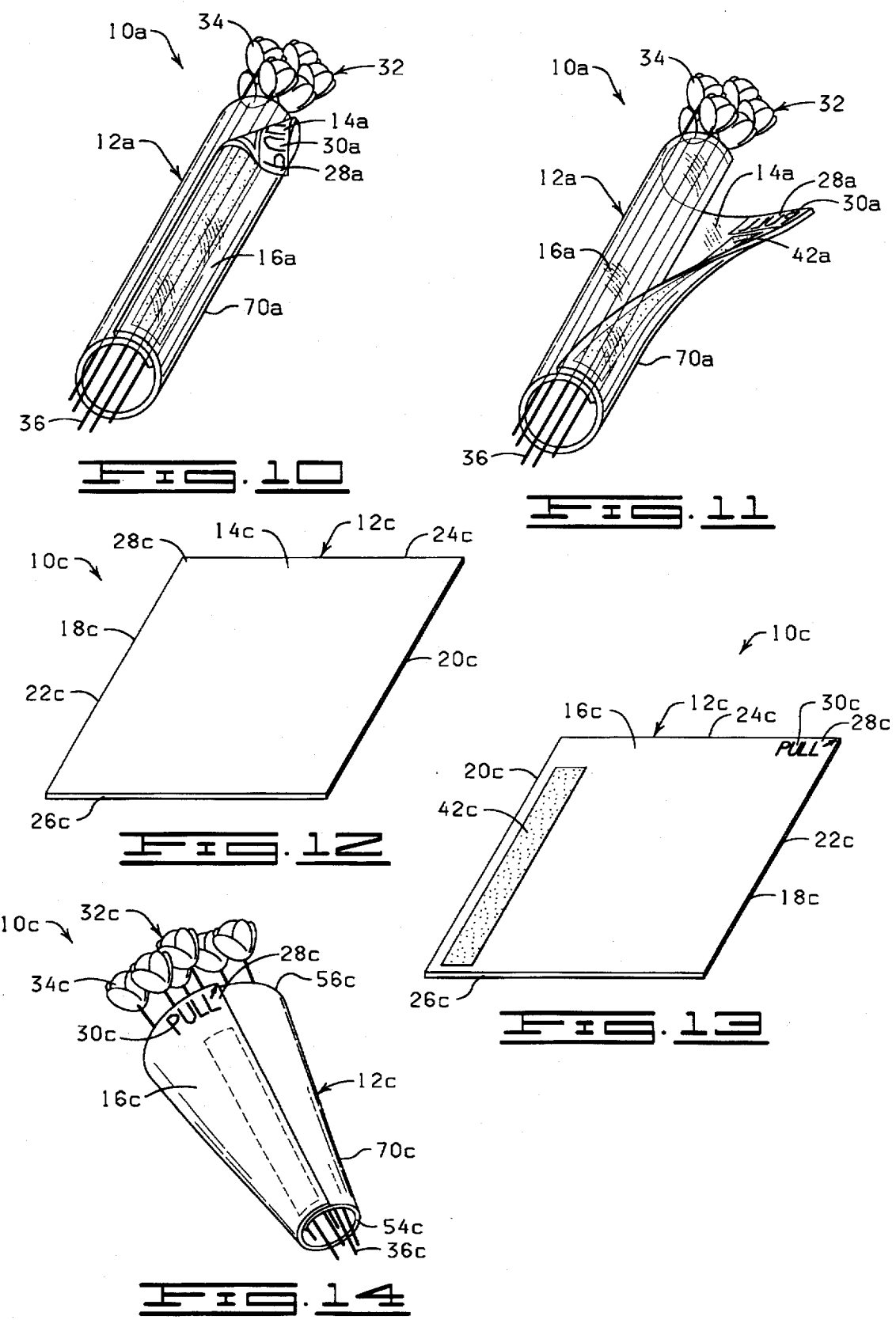

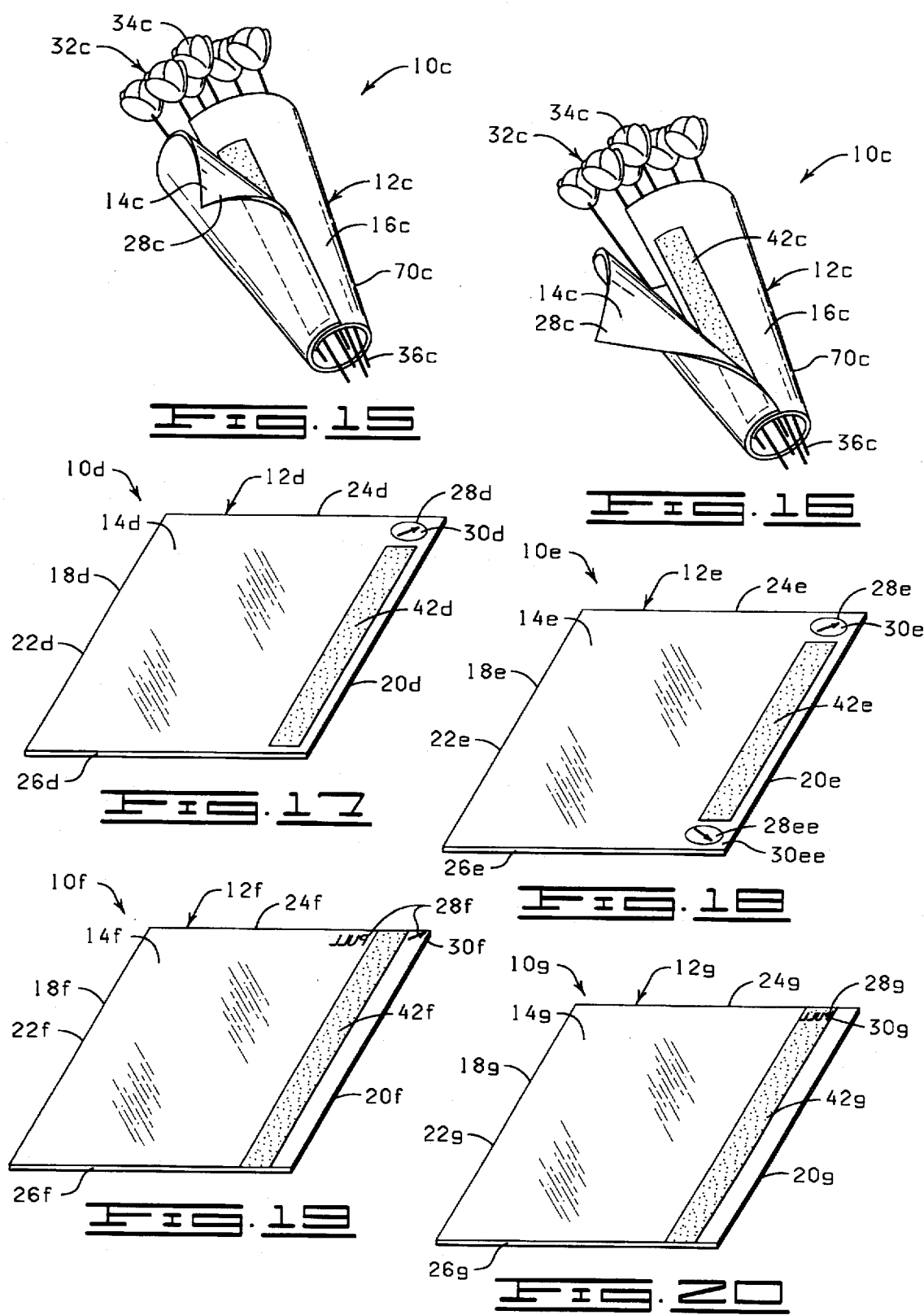

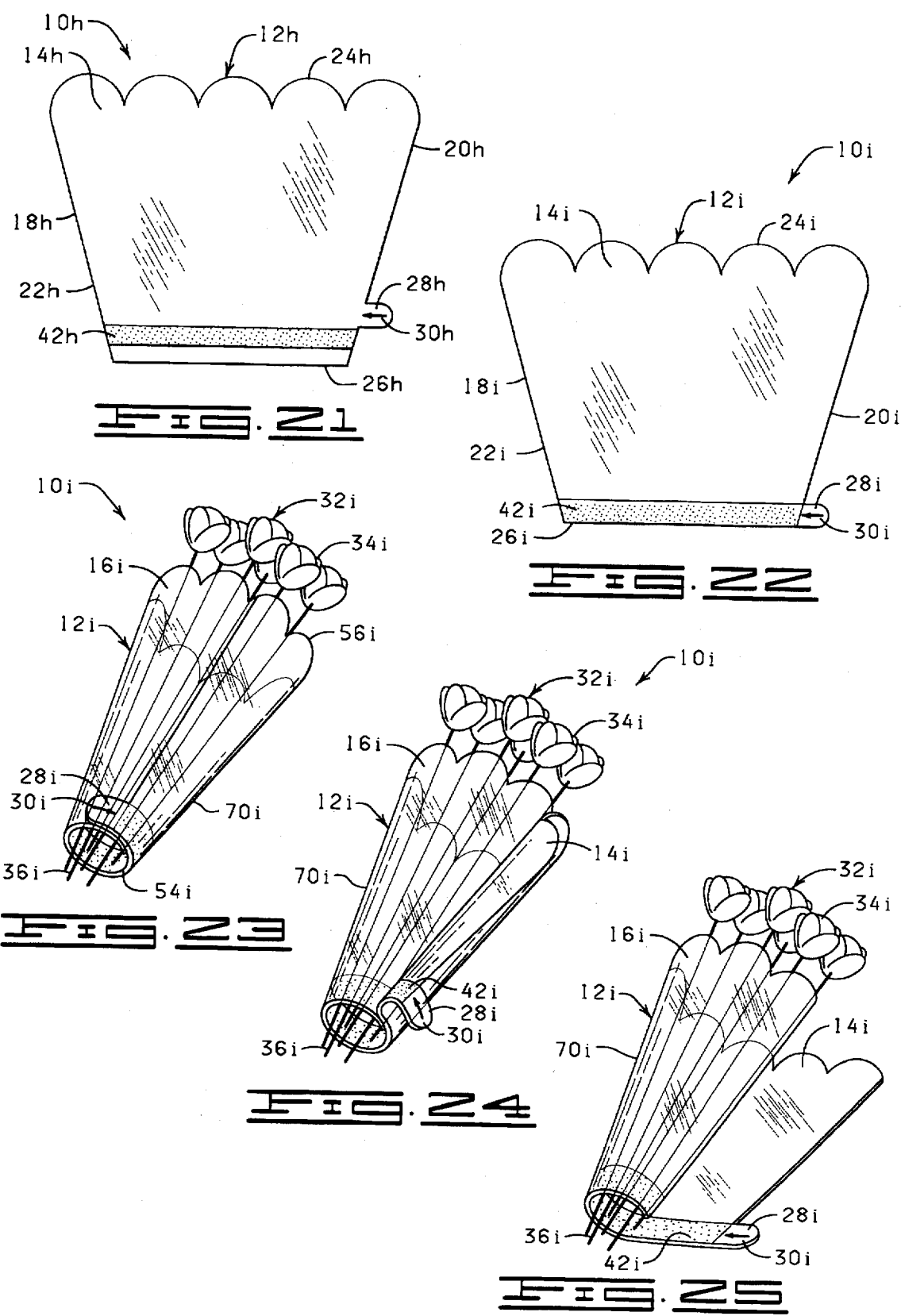

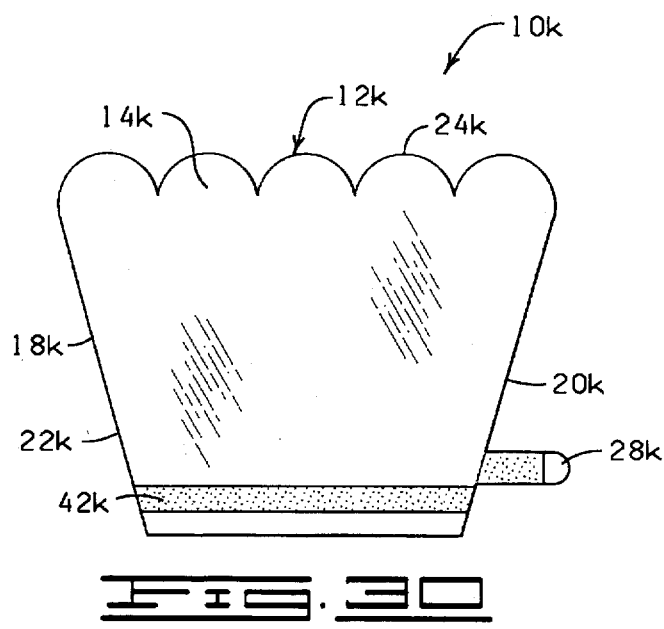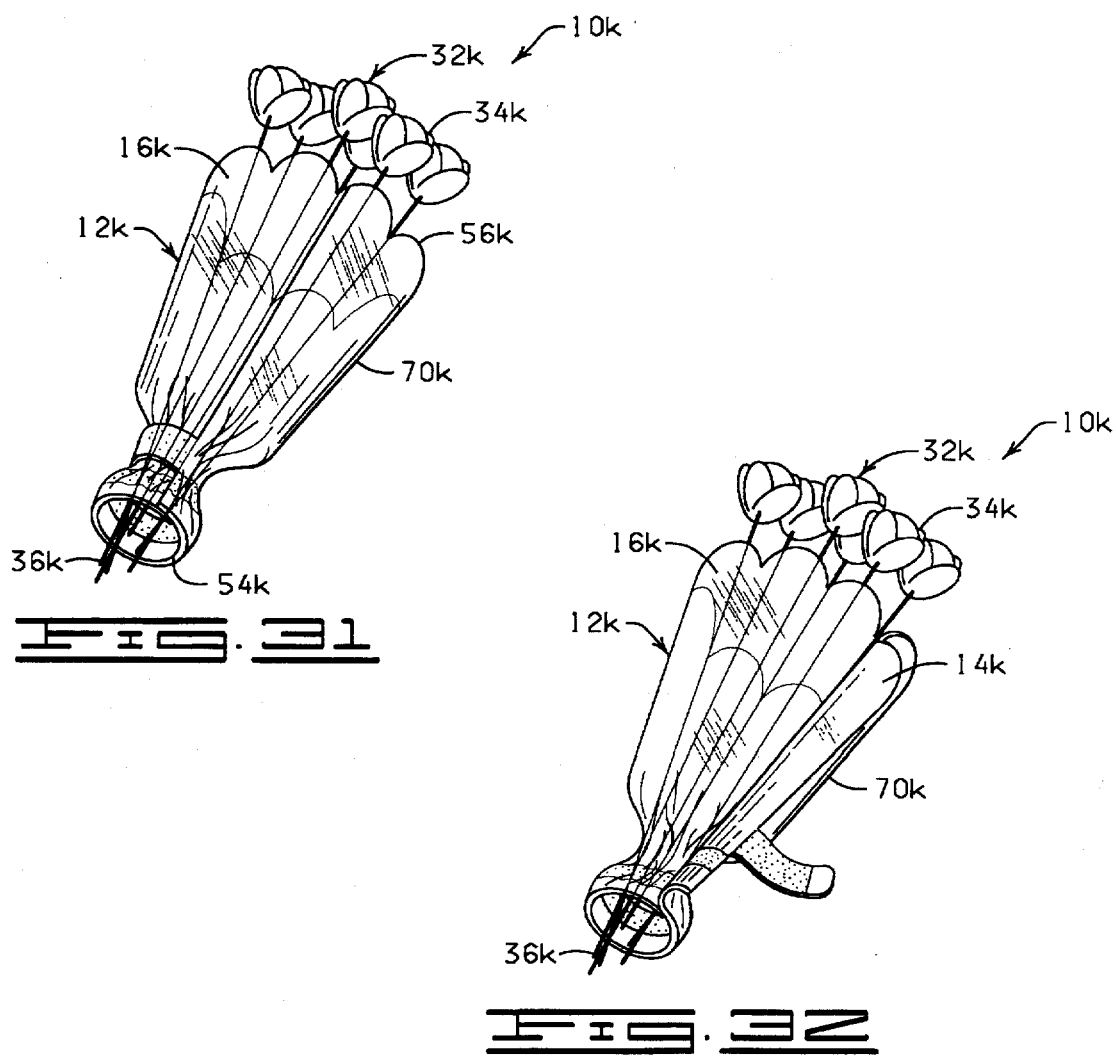

METHOD OF USING A WRAPPING MATERIAL HAVING A PULL TAB AND PULL INDICIA FOR WRAPPING A FLORAL ARRANGEMENT

CROSS-REFERENCE TO RELATED APPLICATIONS

This application is a continuation of U.S. Ser. No. 08/093,838, filed Jul. 19, 1993, entitled METHOD OF USING A WRAPPING MATERIAL HAVING A PULL TAB AND PULL INDICIA FOR WRAPPING A FLORAL ARRANGEMENT, now U.S. Pat. No. 5,467,573; which is a continuation-in-part of U.S. Ser. No. 07/963,882, filed Oct. 20, 1992, entitled WRAPPING MATERIAL HAVING A PULL TAB AND PULLING INDICIA FOR WRAPPING A FLORAL ARRANGEMENT AND METHOD; now U.S. Pat. No. 5,408,803; which is a continuation-in-part of U.S. Ser. No. 865,563, filed Apr. 9, 1992, entitled METHODS FOR WRAPPING A FLORAL GROUPING, now U.S. Pat. No. 5,245,814; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638; which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

Said application Ser. No. 07/963,882 is also a continuation-in-part of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,634; which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned, which is a continuation-in-part of U.S. Ser. No. 07/391,463, filed Aug. 9, 1989, entitled ADHESIVE APPLICATOR DISPENSER, now abandoned.

Said application Ser. No. 07/502,358 is also a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

FIELD OF THE INVENTION

This invention generally relates to wrapping materials, and, more particularly, to wrapping materials having a pull tab and pull indicia for both wrapping a floral arrangement and removing the wrapping material from a floral arrangement, and the method of using same.

BRIEF DESCRIPTION OF THE DRAWINGS

FIG. 1 is a perspective view of the wrapping material of the present invention showing the upper surface, the wrapping material being transparent and having a bonding material extending along one side, a pull tab and pull indicia being located immediately above the bonding material.

FIG. 2 is a perspective view of the wrapping material of FIG. 1, but showing the lower surface thereof.

FIG. 3 is a perspective view of the wrapping material of FIG. 1, but shying a plurality of sheets comprising a pad.

FIG. 4 is a perspective view of the wrapping material of FIG. 1, but showing a continuous roll of material comprising a plurality of sheets of material contained within a roll in a dispenser.

FIG. 5 is a perspective view of the wrapping material of FIG. 1, but showing a continuous roll of material comprising a plurality of sheets of material contained within a roll.

FIG. 6 is a perspective view of the wrapping material of FIG. 3, but showing a floral arrangement disposed thereon.

FIG. 7 is a perspective view of the wrapping material of FIG. 3, but showing a partially wrapped floral arrangement.

FIG. 8 is a perspective view of the wrapping material of FIG. 3, but showing a partially wrapped floral arrangement.

FIG. 9 is a perspective view of the wrapping material of FIG. 3, but showing a wrapped floral arrangement.

FIG. 10 is a perspective view of the wrapped floral arrangement of FIG. 9, but showing the floral arrangement partially unwrapped.

FIG. 11 is a perspective view of the wrapped floral arrangement of FIG. 9, but showing the wrapping material unwrapping from around the floral arrangement.

FIG. 12 is a perspective view of a modified wrapping material constructed exactly like the wrapping material of FIGS. 1-2, but showing a non-transparent wrapping material with no pull indicia on the upper surface of the sheet of material.

FIG. 13 is a perspective view of the wrapping material of FIG. 12, but showing the pull indicia disposed on the lower surface of the sheet of material.

FIG. 14 is a perspective view of the wrapping material of FIG. 12, but showing a wrapped floral arrangement, the pull indicia being readily apparent.

FIG. 15 is a perspective view of the wrapped floral arrangement of FIG. 14, but showing the floral arrangement partially unwrapped.

FIG. 16 is a perspective view of the wrapped floral arrangement of FIG. 14, the wrapping material unwrapping from around the floral arrangement.

FIG. 17 is a perspective view of a modified wrapping material constructed exactly like the wrapping material of FIGS. 1-2, but showing the pull indicia as symbols.

FIG. 18 is a perspective view of a modified wrapping material constructed exactly like the wrapping material of FIGS. 1-2, but showing a first pull tab and a second pull tab and corresponding first pull indicia and second pull indicia disposed thereon, the pull indicia represented as symbols.

FIG. 19 is a perspective view of a modified wrapping material constructed exactly like the wrapping material of FIGS. 1-2, but showing the bonding material extending substantially along the length of one side of the sheet of material, the pull indicia being located to either side of the bonding material.

FIG. 20 is a perspective view of a modified wrapping material constructed exactly like the wrapping material of FIGS. 1-2, but showing the bonding material extending substantially along the length of one side of the sheet of material, the pull tab and pull indicia being located at the upper end of the bonding material, the bonding material having less bonding at the site of the pull tab and pull indicia.

FIG. 21 is a perspective view of a modified wrapping material constructed exactly like the wrapping material of FIGS. 1–2, but showing the sheet of material as a trapezoidal shape, one side having a scalloped design, the bonding material extending along the lower side of the sheet of material, the pull tab being disposed on an adjoining side of the sheet of material comprising an extension of the sheet of material, the pull indicia being represented as a symbol disposed on the pull tab.

FIG. 22 is a perspective view of a modified wrapping material constructed exactly like the wrapping material of FIG. 21, but showing the pull tab and pull indicia thereon as an extension located at the same level as the bonding material.

FIG. 23 is a perspective view of a the wrapping material of FIG. 22, showing a wrapped floral arrangement.

FIG. 24 is a perspective view of the wrapped floral arrangement of FIG. 23, but showing the floral arrangement partially unwrapped.

FIG. 25 is a perspective view of the wrapped floral arrangement of FIG. 23, but showing the wrapping material unwrapping from around the floral arrangement.

FIG. 30 is a perspective view of a wrapping material constructed exactly like the wrapping material of FIG. 26, but showing the elongation of the pull tab, the pull tab having a bonding material partially disposed thereon.

FIG. 31 is a perspective view of the wrapping material of FIG. 30 showing a wrapped floral arrangement, but showing the wrapper crimped near the stem end of the floral arrangement, and showing the pull tab acting to both crimp the wrapping material and retaining the wrapping material in the crimped condition.

FIG. 32 is a perspective view of the wrapped floral arrangement of FIG. 31, but showing the wrapping material unwrapping from around the floral arrangement.

DESCRIPTION OF THE PREFERRED EMBODIMENTS

Figure 26:
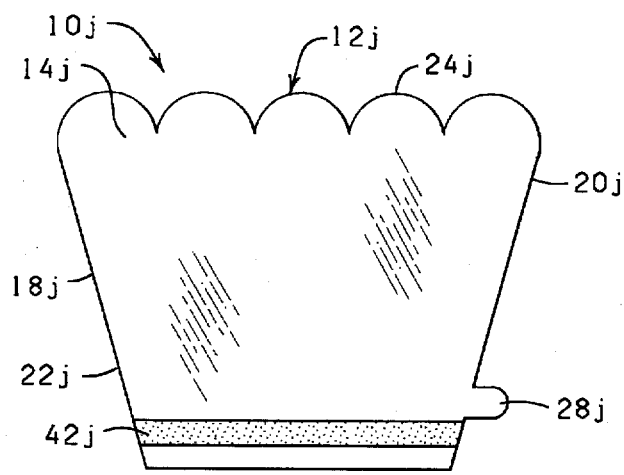
FIG. 26 is a perspective view of a wrapping material constructed exactly like the wrapping material of FIG. 21.

Floral arrangements are usually wrapped in a wrapping material to protect the delicate blooms and foliage from damage. And, the wrapping material utilized frequently has some bonding material thereon, such as an adhesive or cohesive, so that the wrapping material retains its wrapped shape, and securely encompasses the floral arrangement in order to protect it. This type of wrapping material, however, has its disadvantages.

A significant disadvantage occurs when the wrapping material is removed from the floral arrangement. Frequently, it is not obvious where the wrapping material begins or ends. When this occurs, the recipient of the floral arrangement may become frustrated in looking for the edge of the wrapping material, and may, in a state of frustration, tear the wrapping material away from the delicate floral arrangement, damaging the blooms, foliage, or both. A further disadvantage is that, even when it is obvious where the wrapping material begins and ends, it is difficult to release the bonding material which holds the wrapping material about the floral arrangement. The recipient may again inadvertently damage the blooms and/or foliage of the floral arrangement in his/her struggle to lift and release a portion of the bonded wrapping material from itself. As a result, again, damage to the floral arrangement is likely. Such damage interferes with the recipient's enjoyment of the beauty and visual quality of the gift of a floral arrangement.

The present invention contemplates a wrapping material which has a bonding material thereon (the bonding material being described in detail below) which enhances the ability to wrap a floral arrangement. The present invention also contemplates a wrapping material which is readily removed, that is, a wrapping material which also has a pull tab and pull indicia which permits the edge of the wrapping material to be identified, and which permits the bonding material to be more readily released from the wrapping material, so that the wrapping material can be quickly and easily removed from the floral arrangement without causing damage to the delicate and fragile blooms and foliage. The present invention also contemplates crimping of the wrapping near the stem end of a floral arrangement, that is, crimping the wrapping material after it is rolled about a floral arrangement and formed into a wrapping/wrapper. Either the bonding material, the pull tab, or both may act to crimp the wrapping/wrapper about the stem end of the floral arrangement, and retain the wrapping/wrapper thereabout in a crimped condition.

The Embodiment of FIGS. 1–2

Referring to FIGS. 1 and 2, designated generally by the reference numeral 10 is a wrapping material which is constructed in accordance with the present invention. The wrapping material 10 comprises at least one sheet of material 12. The sheet of material 12 has an upper surface 14, a lower surface 16 (one edge of the sheet material lifted for illustration purposes only), and an outer periphery 18. The outer periphery 18 of the sheet of material 12 further comprises a first side 20, a second side 22, a third side 24, and a fourth side 26. The sheet of material 12 also has a pull tab 28 and pull indicia 30, which are described in detail below.

The sheet of material 12 is utilized to wrap a floral arrangement 32. "Floral arrangement" as used herein means cut fresh flowers, artificial flowers, other fresh and/or artificial plants or other floral materials and may include other secondary plants and/or ornamentation which add to the aesthetics of the overall floral arrangement 32. The floral arrangement 32 comprises a flower portion 34 which may comprise either a bloom or a foliage portion, and the floral arrangement 32 also comprises a stem portion 36. However, it will be appreciated that the floral arrangement 32 may consist of only a single bloom or only foliage (not shown). It will be understood that the term "floral grouping" is used herein interchangeably with the term "floral arrangement."

In the embodiment of FIG. 1, the sheet of material 12 is square. It will be appreciated, however, that any shape or size of sheet of material 12 may be used to wrap a floral arrangement 32 as long as it is sufficiently sized and shaped to wrap and encompass the floral arrangement 32. For example, the sheet of material 12 may also comprise other geometric and non-geometric shapes. When multiple sheets of material 12 are used together, they may be connected together or laminated, or may comprise separate layers. Finally, it will be appreciated that the sheet of material 12 shown in all embodiments herein is substantially flat.

The sheet of material 12 may be constructed of a single sheet of material 12 or a plurality of sheets of material 12. Any thickness of the sheet of material 12 may be utilized in accordance with the present invention as long as the sheet of material 12 may be wrapped about a floral arrangement 32 and removed from the floral arrangement 32, as described herein. Typically the sheet of material 12 has a thickness in a range of less than about 0.2 mils to about 30 mils. In one embodiment, the sheet of material 12 is constructed from one sheet of polymer film having a thickness in a range of from less than about 0.5 mils to about 2.5 mils. In an alternate embodiment, the sheet of material is constructed from polymer film having a thickness in a range of from less than about 0.2 mils to about 10 mils.

The sheet of material 12 is constructed from any suitable material that is capable of being wrapped about a floral arrangement 32. Preferably, the wrapping material 10 comprises paper (untreated or treated in any manner), cellophane, foil, polymer film, fiber (woven or non-woven or synthetic or natural), cloth (woven or non-woven or natural or synthetic), burlap, or any combination thereof.

The term "polymer" as used herein means any polymer film. For example, but not by way of limitation, one polymer film is a polypropylene film. Another example of a polymer film, but not by way of limitation, is cellophane.

The sheet of material 12 may vary in color. Further, the sheet of material 12 may be consist of designs which are printed, etched, and/or embossed; in addition, the sheet of material 12 may have various colorings, coatings, flockings, and/or metallic finishes, or be characterized totally or partially by pearlescent, translucent, transparent, iridescent, or the like characteristics. Each of the above-named characteristics may occur alone or in combination. Moreover, each surface of the sheet of material 12 may vary in the combination of such characteristics.

The sheet of material 12 has a width 38 (FIG. 1) extending generally between the first side 20 and the second side 22, respectively, sufficiently sized whereby the sheet of material 12 can be wrapped about and substantially surrounded and compass a floral arrangement 32. The sheet of material 12 has a length 40 (FIG. 1) extending generally between the third side 24 and the fourth side 26, respectively, sufficiently sized whereby the sheet of material 12 extends over a substantial portion of the floral arrangement 32 when the sheet of material 12 has been wrapped about the floral arrangement 32 in accordance with the present invention shown and described in detail herein.

The sheet of material may further comprise an ink, dye, and/or pigment (not shown). Such inks, dyes, and pigments are known in the art, and are commercially available, and may be disposed upon or incorporated in the sheet of material 12 by any method described herein or known in the art. For example, the ink, dye, or pigment may form a portion of a design or decoration on the sheet of material, such as flowers, leaves, and the like.

The sheet of material 12 also comprises a bonding material 42. The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, staples or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

The bonding material 42 may comprise varying bonding characteristics when disposed on certain portions of the sheet of material 12. "Varying bonding characteristics" means less adhesion or cohesion of the bonding material 42, that is, less "tack" of the bonding material 42. Therefore, when the bonding material 42 is disposed on a sheet of material, the bonding material 42 may have less bonding characteristics at or near the pull tab 28.

Further, the bonding material 42 may also comprise at least one color derived from dye, ink, and/or pigment, as previously described herein. Bonding materials as described above, are known in the art and commercially available.

A bonding material 42 is disposed upon the sheet of material 12, preferably on a surface, that is the upper surface 14, the lower surface, or a combination thereof. The bonding material 42, as previously described, is preferably a pressure sensitive adhesive. Such use of adhesives, and particularly pressure sensitive adhesives is taught in U.S. Pat. No. 5,111,638, entitled, "Method For Wrapping An Object With A Material Having Pressure Sensitive Adhesive Thereon," which is hereby incorporated by reference herein.

"Cling Wrap or Material" when used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material which remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein. It will be appreciated that the pull tab (described in detail below), the sheet of material 12, or any portion of either, may comprise cling material.

The term "botanical item" when used herein means a natural or artificial herbaceous or woodyplant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping/floral arrangement.

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "band" when used herein means any material which may be secured about an object such as a flower pot, such bands commonly being referred to as elastic bands, rubber bands or non-elastic bands and also includes any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. The band also may include a bow if desired in a particular application. Such a band may be included as a part of the pull tab (described below) or may comprise the pull tab, however, the pull tab may not comprise a band, and the pull tab may be used without a band attached thereto as well.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 12 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained within a lacquer, or other liquid, before it is disposed upon the sheet of material 12. The scent may also be contained within a dye, ink, and/or pigment (not shown). Such dyes, inks and pigments are known in the art, and are commercially available, and may be disposed upon or incorporated in the sheet of material 12 by any method described herein or known in the art.

The sheet of material 12 comprises a pull tab 28 and pull indicia 30. "Pull tab" as used herein means a portion of the sheet of material 12, near the outer periphery 18 of the sheet of material, preferably near at least one side of the sheet of material 12, wherein the sheet of material 12 may be easily grasped by an operator (between the operator's fingers, or between the operator's thumb and at least one finger) and lifted and unwrapped from itself and the floral arrangement 32. The pull tab 28 permits at least one of the operator's fingers to be slipped under the pull tab 28 in order to grasp the pull tabs 28 and pull one portion of the sheet of material 12 away from at least one other portion of the sheet of material 12. The pull tab 28 may be located near any side, or multiple pull tabs may be located near one side or multiple sides of the sheet of material 12, as long as the pull tab 28 may be easily grasped and lifted away from the wrapped sheet of material 12, thereby causing the sheet of material 12 to unwrap from around itself and the floral arrangement 32, thereby gently releasing the floral arrangement from the wrapping material 10.

The pull tab 28 may form a portion of the sheet of material 12, or the pull tab 28 may form a die-cut extension of the sheet of material 12. Further, the pull tab 28 may comprise an integral portion of the sheet of material 12, or may form a small second separate sheet of material 12 which may be separately attached, either after the sheet of material 12 has been constructed (not shown), or after the sheet of material 12 has been wrapped about a floral arrangement 32 (not shown). Located at or near the pull tab 28 is pull indicia 30. "Pull indicia" as used herein means symbols, such as arrows, or a small picture of the lifted edge of a sheet of material, or a round dot, circle, square, or the like, or printed words, such as "pull," "pull here," "lift here," "lift to release," "lift," or any symbol or words which would indicate that the sheet of material 12 could be unwrapped by starting at that specific point, or any combination of words and/or symbols.

For example, FIG. 1 shows a pull tab with the word "Pull" printed in the corner of the sheet of material 12 indicating that removal of the sheet of material 12 from the floral arrangement 32 is to be initiated at that point. That is, the pull tab 28 is located in the area designated by the pull indicia 30, and the pull tab 28 may be grasped to initiate the removal of the sheet of material 12 from the floral arrangement 32.

The pull tab 28 and/or the pull indicia 30 may be located on any portion of the sheet of material 12 having a bonding material 42 thereon (FIG. 20), or, alternatively, may be located in an area without bonding material 42 (FIG. 1). When the pull tab 28 is located on bonding material 42, the bonding material at the location of the pull tab 28 has less "tack" or bonding, as previously described, than the remainder of the bonding material 42 disposed on the sheet of material 12.

The sheet of material 12 shown in FIGS. 1–2 shows the use of a pull tab 28 and pull indicia 30 near the corner junction of the first side 20 and the third side 24 of the sheet of material 12. The bonding material 42 does not extend into this junction, thereby forming a non-bonded area for the pull tab 28. Disposed on the pull tab 28 is pull indicia 30 comprising a square, with the word "Pull" printed in the square (the word "pull" appears backwards in FIG. 1, because when wrapped, the lower surface 16, as shown in FIG. 2, would be exposed, thus exposing the pull indicia 30 "Pull" correctly).

It will be appreciated that more than one pull tab area may be disposed upon the sheet of material. Further, more than one change in bonding characteristics that is, the bonding or "tack" of the bonding material, as described above, may be disposed upon the sheet of material (not shown).

The Embodiment of FIG. 3

Illustrated in FIG. 3 is a modified material 10a which is constructed exactly like the material 10 shown in FIGS. 1–2, and described in detail previously, except that the sheet of material 12a comprises a plurality of sheets of material 12a connected together to form a pad 44 of sheets of material 12a. The pad 44 comprises a plurality of sheets of material 12a stacked one on top of the other and positioned so that the periphery 18a, that is, the first sides 20a, the second sides 22a, the third sides 24a, and the fourth sides 26a of the sheets of material 12a in the pad 44 generally are aligned.

Referring to FIG. 3, the pad 44 further comprises a top sheet of material 46 and a next sheet of material 48 disposed thereunder, the other sheets of material 12a being disposed under the next sheet of material 48 in the pad 44 of the sheets of material 12a. Each sheet of material 12a in the pad 44 may have a bonding material 42a (not shown) disposed thereupon, near at least a portion of the periphery 18a of each sheet of material 12a, and each sheet of material 12a having a bonding material 42a thereon is bondingly connectable to a portion of another sheet of material 12a for cooperating to connect the sheets of material 12a into the pad 44.

The top sheet of material 46 is capable of being disconnected from the pad 44 of sheets of material 12a. When the top sheet of material 46 is disconnected, the next sheet of material 48 forms the new top sheet of material 46, and the sheet of material 12a lying under the new top sheet of material 46 forms a new next sheet of material 48.

A bonding material 42a is disposed on each sheet of material 12a in the pad 44 and bondingly and releasably connects each sheet of material 12a to one other sheet of material 12a in the pad 44 whereby one of the sheets of material 12a can be releasably disconnected from another sheet of material 12a by pulling the sheets of material 12a apart. Further, the bonding material 42a bondingly and releasably connects each sheet of material 12a to portions of itself.

The Embodiment of FIGS. 4–5

Illustrated in FIGS. 4–5 is a modified material 10b which is constructed exactly like the material 10 shown in FIGS. 1–2 and described in detail previously except that the material 10b comprises a roll 50 of sheets of material 12b contained within a dispenser 52, as shown in FIG. 4. The roll 50 contains a material 10b comprising a plurality of sheets of material 12b in the roll 50, the sheets of material 12b being connected by perforations to form the roll 50 (the sheet of material 12b shown partially detached and turned upward for illustration purposes only). Such a roll 50 may be provided without a dispenser 52 as well, as shown in FIG. 5. Such rolls 50 permit one sheet of material 12b to be withdrawn from the roll 50, and the sheet of material 12b is detached or severed from the roll 50. Alternatively, the roll 50 may simply be formed as a continuous roll 50 without perforations, and the wrapping material 10b may be withdrawn from the roll 50 and a portion may be severed into separate sheets of material 12b by serrated cutting edge (not shown) contained within the dispenser 52, or by a separate cutting element (not shown). Any number of sheets of material 12b may form the roll 50 as long as it is possible to withdraw at least one sheet of material 12b from the roll 50. It will be understood therefore that the roll 50 may comprise only one sheet of material 12b, without the dispenser 52 (not shown).

The Method Of Use of FIGS. 6–11

FIGS. 6–11 illustrate one method of use of the present invention. The wrapping material 10a and the sheet of material 12a illustrated in this embodiment and used in this method are constructed exactly the same as the wrapping material 10a and the sheet of material 12a in FIG. 3 and described in detail previously.

In a general method of use, a floral arrangement 32 is placed on the top sheet of material 46, the sheet of material 12a being sized to wrap about and substantially surround and encompass the floral arrangement 32. The sheet of material 12a is wrapped about the floral arrangement 32, the sheet of material 12a simultaneously disconnecting from the pad 44 of sheets of material 12a as the sheet of material 12a is wrapped about the floral arrangement 32. A portion of the sheet of material 12a, such as the second side 22a of the sheet of material 12a, overlaps at least one other portion of the sheet of material 12a. The overlapping portions of the sheet of material 12a are bonded to the sheet of material 12a by their contact with the bonding material 42a on the upper surface 14a of the sheet of material 12a which bondingly contacts and engages the overlapped portions of the sheet of material 12a, whereby the second side 22a of the sheet of material 12a is bonded to overlapping portions of the sheet of material 12a generally between the third side 24a and the fourth side 26a of the sheet of material 12a whereby there are no loose flaps formed by unbonded portions of the sheet of material 12a. The sheet of material 12a substantially encompasses and surrounds a substantial portion of the flower portion 34 of the floral arrangement 32. The sheet of material 12a is held about the floral arrangement 32 by the bonding contact of the overlapping portions of the sheet of material 12a, the sheet of material 12a being tightly wrapped about the stem portion 36 of the floral arrangement 32. The sheet of material 12a wrapped about the floral arrangement 32 forms a cylindrically-shaped wrapping 70a (FIG. 9), or, alternatively, a conically-shaped wrapping 70c (FIG. 14), or, in further alternatives, may form any geometric, non-geometric, or asymmetrical shaped wrapping. Both shapes of wrappings 70a and 70c shown herein have an opening extending through a lower end 54 thereof and an opening extending through the upper end 56 thereof with the stem portion 36 of the floral arrangement 32 extending through the opening in the lower end 54 and the flower portion 34 of the floral arrangement 32 being exposed near the opening in the upper end 56 thereof, the upper end 56 of the wrappings 70a and 70c being loosely wrapped about the flower portion 34 of the floral arrangement 32.

FIGS. 6–11 show one specific method of use. A plurality of sheets of material 12a in a pad 44, and a floral arrangement 32, as described above, are provided. The floral arrangement 32 is disposed on the top sheet of material 46 on the pad 44 of sheets of material 12a. An operator then lifts a portion of the top sheet 46 (generally the portion near the second side 22a) and places the lifted portion over a portion of the floral arrangement 32, as shown in FIG. 7. In this position, the top sheet of material 46 is rolled over the floral arrangement 32, and the top sheet of material 46 and the floral arrangement 32 are rolled in a general direction 58 (FIGS. 7–8) whereby the top sheet of material 46 and the floral arrangement 32 contained therein are lifted from the next sheet of material 48 (FIG. 9), the floral arrangement 32 being rolled into the top sheet of material 46, thereby rolling the top sheet of material 46 generally about the floral arrangement 32 and containing and substantially encompassing the floral arrangement 32 within the top sheet of material 46.

The top sheet of material 46 and the floral arrangement 32 contained therein are continued rolled in a rolling direction 60 and in the direction 58 generally toward the first side 20a of the top sheet of material 46 until the floral arrangement 32 is disposed generally adjacent the first side 20a of the top sheet of material 46, as shown in FIG. 8. In this position, the operator continues to roll the top sheet of material 46 and the floral arrangement 32 disposed thereon in the rolling direction 60 and in the general direction 58 thereby lifting the top sheet of material 46 from the next sheet of material 48 and releasing the top sheet of material 46 from the bonding material 42a disposed on the next sheet of material 48, the next sheet of material 48 generally beneath the top sheet of material 46 and simultaneously disconnecting the top sheet of material 46 from the bonding material 42a connection between the top sheet of material 46 and the next sheet of material 48. The adjacent upper surface 14a of the second side 22a of the top sheet of material 46 is then bondingly connected to the bonding material 42a on the upper surface 14a of the top sheet of material 46 near the first side 20a, thereby securely wrapping the floral arrangement 32, as shown in FIG. 9, the method of wrapping permitting the pull tab 28a and pull indicia 30a on the top sheet of material 46 to be readily visible on the wrapped floral arrangement 32.

When the top sheet of material 46 has been secured about the floral arrangement 32 in the manner just described, the next sheet of material 48, generally under the top sheet of material 46, then provides a new top sheet of material 46, the sheet of material 12a under the new top sheet of material 46 providing a new next sheet of material 48, and the process can be repeated for wrapping additional or other floral arrangements 32.

Such a method of wrapping is shown and described in detail in U.S. Pat. No. 5,181,364, entitled, "Wrapping a Floral Grouping With Sheets Having Adhesive Or Cohesive Material Applied Thereto," which issued Jan. 26, 1993. U.S. Pat. No. 5,181,364 is specifically incorporated by reference herein.

In the wrapped condition with the sheet of material 12 wrapped about the floral arrangement 32, the wrapped sheet of material 12 forms a "wrapping" or wrapper 70a. Further, it will be understood that the terms "wrapping" and "wrapper" are used interchangeably herein. The wrapper 70a, when formed, permits both the stem portion 36 of the floral arrangement 32 to extend through the opening in the lower end 54 of the wrapper 70 and the bloom portion 34 of the floral arrangement to extend through the opening in the upper end 56 of the wrapper 70a.

FIGS. 10 and 11 show a method of removing the sheet of material 12a from the wrapped floral arrangement 32. The pull tab 28a and pull indicia 30a are located in a position on the wrapped sheet of material 12a which is easily visible to the operator. The operator grasps the pull tab 28a between his fingers (or between his thumb and at least one finger, by placing at least one finger on one surface of the pull tab 28a and at least one other finger on one other surface of the pull tab 28a), and pulls the portion of the sheet of material 12a surrounding the pull tab 28a away from the underlying portion of the sheet of material 12a that it overlapped and was bonded to. The bonding material 42a readily releases the portion of the sheet of material 12a surrounding the pull tab 28a from the underlying portion of the sheet of material 12a lying directly thereunder, thus permitting quick and easy removal of the sheet of material 12a from the floral arrangement 32, said removal being accomplished without causing damage to the delicate floral arrangement 32.

The Embodiment And Method Of Use Of FIGS. 12–16

FIGS. 12–16 illustrate another embodiment and method of use of the present invention. The wrapping material 10c and sheet of material 12c illustrated in this embodiment and used in this method are constructed exactly the same as the wrapping material 10 and the sheet of material 12 shown in FIGS. 1–2 and described in detail previously, except that the sheet of material 12c is not transparent, the pull indicia 30c comprises both the word "Pull" and an arrow symbol pointing to the corner junction of the first side 20c and the third side 24c of the sheet of material 12c, and the pull indicia 30c is printed on the lower surface 16c of the sheet of material 12c.

A floral arrangement 32c is disposed upon the sheet of material 12c, in the same manner shown in FIGS. 6–11 and described in detail previously for the method of use of wrapping material 10a and the sheet of material 12a, except that a single sheet of material 12c is utilized, and the wrapping material 10c forms generally a conical-shaped wrapper 70c. The sheet of material 12c is unwrapped from the floral arrangement 32c in exactly the same manner as shown herein and described in detail previously.

The Embodiment and Method of Use of FIG. 17

FIG. 17 illustrates another embodiment of the present invention. The wrapping material 10d and sheet of material 12d illustrated in this embodiment and used in this method are constructed exactly the same as the wrapping material 10 and the sheet of material 12 shown in FIGS. 1–2 and described in detail previously, except that the sheet of material 12d has a pull indicia 30d of a circle with an arrow pointing to the corner junction of the first side 20d and the third side 24d of the sheet of material 12d.

A floral arrangement 32d (not shown) is disposed upon the sheet of material 12d in the same manner shown in FIGS. 6–11 and described in detail previously for the method of use of wrapping material 10a and the sheet of material 12a, however, it will be appreciated that any method of use shown or described herein may be utilized. The sheet of material 12d is unwrapped from a floral arrangement 32d (not shown) in exactly the same manner as shown herein and described in detail previously.

The Embodiment and Method of Use of FIG. 18

FIG. 18 illustrates another embodiment of the present invention. The wrapping material 10e and sheet of material 12e illustrated in this embodiment and used in this method are constructed exactly the same as the wrapping material 10 and the sheet of material 12 shown in FIGS. 1–2 and described in detail previously, except that the sheet of material 12e has a first pull tab 28e and a second pull tab 28ee, a first pull indicia 30e and a second pull indicia 30ee, the first pull indicia 30e being disposed near the first pull tab 28e, and the second pull indicia 30ee being disposed near the second pull tab 28ee, the first pull tab 28e and pull indicia 30e being located near the corner junction of the first side 20e and the third side 24e of the sheet of material 12e, the second pull tab 28ee and pull indicia 30ee being located near the corner junction of the first side 20e and the fourth side 26e, the first pull indicia 30e comprising a circle with an arrow pointing to the corner junction of the first side 20e and the third side 24e of the sheet of material 12e, the second pull indicia 30ee comprising a circle with an arrow pointing to the corner junction of the first side 20e and the fourth side 26e of the sheet of material 12e.

A floral arrangement 32e (not shown) is disposed upon the sheet of material 12e in the same manner shown in FIGS. 6–11 and described in detail previously for the method of use of wrapping material 10a and the sheet of material 12a, however, it will be appreciated that any method of use shown or described herein may be utilized. The sheet of material 12e is unwrapped from a floral arrangement 32e (not shown) in exactly the same manner as shown herein and described in detail previously, except that either the first pull tab 28e may be used to unwrap the floral arrangement 32e, or the second pull tab 28ee may be used, or both the first pull tab 28e and the second pull tab 28ee may be utilized to remove the sheet of material 12e from the floral arrangement 32e, in either a concurrent or sequential manner.

The Embodiment and Method of Use of FIG. 19

FIG. 19 illustrates another embodiment of the present invention. The wrapping material 10f and sheet of material 12f illustrated in this embodiment and used in this method are constructed exactly the same as the wrapping material 10 and the sheet of material 12 shown in FIGS. 1–2 and described in detail previously, except that the sheet of material 12f has a bonding material 42f strip which extends near the entire length of the first side 20f, that is, from the third side 24f to the fourth side 26f, the pull tab 28f and pull indicia 30f being disposed on either side of the bonding material 42f strip and near the third side 24f, with the pull indicia 30f "Pull" on one side of the bonding material 42f, and the pull indicia 30f symbol of an arrow disposed on the other side of the bonding material 42f, that is, near to and pointing to the corner junction of the first side 20f and the third side 24f of the sheet of material 12f.

A floral arrangement 32f (not shown) is disposed upon the sheet of material 12f in the same manner shown in FIGS. 6–11 and described in detail previously for the method of use of wrapping material 10a and the sheet of material 12a, however, it will be appreciated that any method of use shown or described herein may be utilized. The sheet of material 12f is unwrapped from a floral arrangement 32f (not shown) in exactly the same manner as shown herein and described in detail previously.

The Embodiment and Method of Use of FIG. 20

FIG. 20 illustrates another embodiment of the present invention. The wrapping material 10g and sheet of material 12g illustrated in this embodiment and used in this method are constructed exactly the same as the wrapping material 10 and the sheet of material 12 shown in FIGS. 1–2 and described in detail previously, except that the sheet of material 12g has a bonding material 42g strip which extends the entire length of the sheet of material 12g near the first side 20g, from the third side 24g to the fourth side 26g, the pull tab 28g and pull indicia 30g being near the end of the bonding material 42g strip, that is, near the third side 24g of the sheet of material 12g and near the corner junction of the first side 20g and the third side 24g of the sheet of material 12g, the bonding characteristics or "tack" of the bonding material 42g being decreased, as described previously, at the site of the pull tab 28g and pull indicia 30g to enhance an operator's ability to grasp the pull tab 28g and remove the sheet of material 12g from a floral arrangement 32g.

A floral arrangement 32g (not shown) is disposed upon the sheet of material 12g in the same manner shown in FIGS. 6–11 and described in detail previously for the method of use of wrapping material 10a and the sheet of material 12a, however, it will be appreciated that any method of use shown or described herein may be utilized. The sheet of material 12g is unwrapped from a floral arrangement 32g (not shown) in exactly the same manner as shown herein and described in detail previously, except that, in a further alternative, the sheet of material 12g may be removed from the floral arrangement 32g by the operator first inserting a finger (or fingers) under the pull tab 28g on the outer wrapped layer of the sheet of material 12g at the point indicated by the pull indicia 30g to grasp the pull tab 28g for removal of the sheet of material 12g.

The Embodiment and Method of Use of FIG. 21

FIG. 21 illustrates still another embodiment of the present invention. The wrapping material 10h and sheet of material 12h illustrated in this embodiment and used in this method are constructed exactly the same as the wrapping material 10 and the sheet of material 12 shown in FIGS. 1–2 and described in detail previously, except that the sheet of material 12h is die-cut into a trapezoidal shape and has a scalloped design cut into the third side 24h of the sheet of material 12h, the bonding material 42h is a strip of bonding material 42h which is disposed generally between the first side 20h and the second side 22h of the sheet of material 12h, the bonding material 42h disposed near the fourth side 26h, and the pull tab 28h has been die-cut as an extension of the sheet of material 12h, and the pull tab 28h has pull indicia 30h represented as an arrow thereon. The pull tab 28h is situated slightly above the bonding material 42h, on the first side of the sheet of material 12h and near the corner junction of the first side 20h and the fourth side 26h of the sheet of material 12h.

A floral arrangement 32h (not shown) is disposed upon the sheet of material 12h in the same manner shown in FIGS. 6–11 and described in detail previously for the method of use of wrapping material 10a and the sheet of material 12a, however, it will be appreciated that any method of use shown or described herein may be utilized. The sheet of material 12h is unwrapped from a floral arrangement 32h in exactly the same manner as shown herein and described in detail previously.

The Embodiment and Method of Use of FIGS. 22–25

FIGS. 22–25 illustrate still another embodiment of the present invention and method of use of the present invention. The wrapping material 10i and sheet of material 12i illustrated in this embodiment and used in this method are constructed exactly the same as the wrapping material 10h and the sheet of material 12h shown in FIG. 21 (wrapping material 10h and sheet of material 12h being exactly like FIGS. 1–2 and described in detail previously, except for the differences described above) except that, as shown in FIG. 22, the pull tab 28i is die-cut adjacent the bonding material strip 42i, the pull tab 28i being located on the first side 20i of the sheet of material 12i and in the corner junction of the first side 20i and the fourth side 26i of the sheet of material 12i.

A floral arrangement 32i is disposed upon the sheet of material 12i in the same manner shown in FIGS. 6–11 and described in detail previously for the method of use of wrapping material 10a and the sheet of material 12a, however, it will be appreciated that any method of use shown or described herein may be utilized (FIG. 23). The sheet of material 12i is unwrapped from a floral arrangement 32i in exactly the same manner as shown herein and described in detail previously, as shown in FIGS. 24–25.

The Embodiment and Method of Use of FIGS. 26–29

FIGS. 26–29 illustrate still another embodiment of the present invention and method of use of the present invention. The wrapping material 10j and sheet of material 12j illustrated in this embodiment and used in this method are constructed exactly the same as the wrapping material 10h and the sheet of material 12h shown in FIG. 21 (wrapping material 10h and sheet of material 12h being exactly like FIGS. 1–2 and described in detail previously, except for the differences described above).

Figure 28:
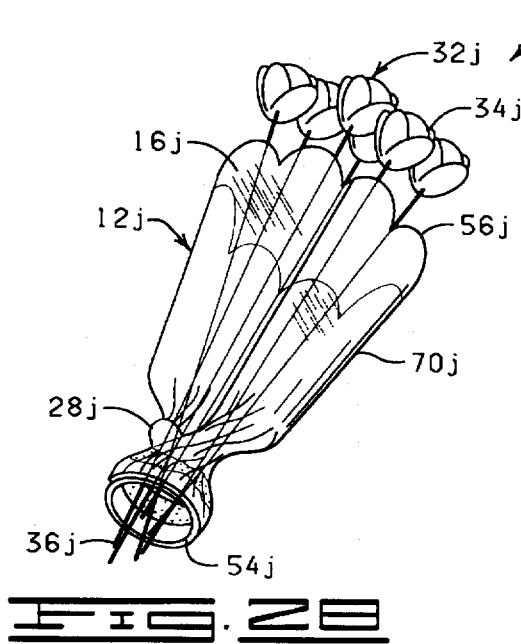
FIG. 28 is a perspective view of the wrapped floral arrangement, but showing the wrapper crimped near the stem end of the floral arrangement, the crimped end being twisted about the stem end by being rotated clockwise one-quarter turn.

A floral arrangement 32j is disposed upon the sheet of material 12j in the same manner shown in FIGS. 6–11 and described in detail previously for the method of use of wrapping material 10a and the sheet of material 12a, however, it will be appreciated that any method of use shown or described herein may be utilized. The method for wrapping the floral arrangement 32j with the sheet of material 12j differs somewhat from the previously described methods, in that the sheet of material 12j is crimped about the stem portion 36j of the floral arrangement 32j near the fourth side 26j of the sheet of material 12j, that is, in and around the area where the bonding material 42j is disposed. The crimping may be conducted as the floral arrangement 32j is wrapped (not shown), or the crimping may be conducted after the floral arrangement 32j is wrapped by crimping the sheet of material 12j in the area of the strip of bonding material 42j. Such crimping may be conducted by hand, by grasping and substantially encompassing with one or more hands the lower end of the wrapper 70j near the fourth side 26j of the sheet of material 12j, in the area of the strip of bonding material 42j, and evenly and firmly squeezing the sheet of material 12j about the area of the strip of bonding material 42j, near the fourth side 26j of the sheet of material 12j, thereby pressing and gathering both the sheet of material 12j near the fourth side 26j against itself and against the stem portion 36j of the floral arrangement 32j and the bonding material 42j against itself and against the stem portion 36j of the floral arrangement 32j. The wrapper 70j may also be crimped by using both a crimping motion and a turning motion to create a twisted crimping, as illustrated in FIG. 28, resulting in a wrapper 70j which is both crimped, as described previously, and which is twisted about the stem portion 36j (the sheet of material 12j near the stem portion 36j being rotated between about one-eighth of a turn to about a full turn) primarily in the area near the stem portion 36j of the floral arrangement 32j. Such crimping as described above may also be conducted by any instrument or machine used for gathering or crimping packaging materials.

Figure 27:
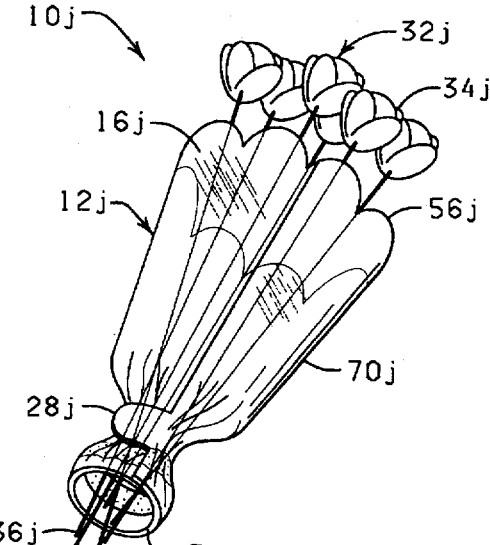
FIG. 27 is a perspective view of the wrapping material of FIG. 26 showing a wrapped floral arrangement, but showing the wrapper crimped near the stem end of the floral arrangement.

The pull tab 28j may extend over the crimped area, as shown in FIG. 27 to permit easy removal of the sheet of material 12j. Alternatively, the pull tab 28j may be at least partially tucked into the wrapper by folding the pull tab 28j toward the inside of the wrapper 70j (not shown) after the floral arrangement 32j has been wrapped and formed into a wrapper.

Figure 29:
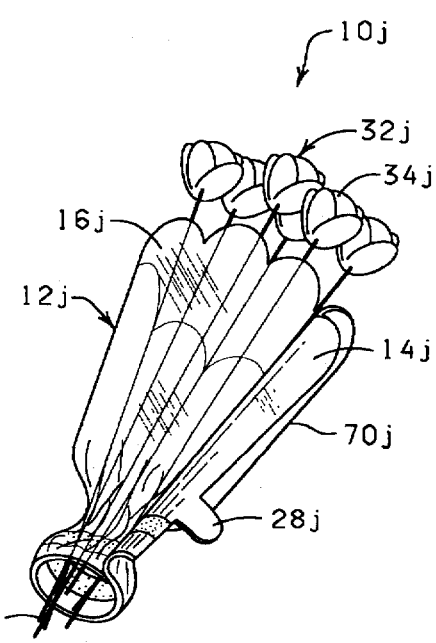
FIG. 29 is a perspective view of the wrapped floral arrangement of FIG. 27, but showing the wrapping material unwrapping from around the floral arrangement.

The sheet of material 12j is unwrapped from a floral arrangement 32j, as shown in FIG. 29, in exactly the same manner as shown herein and described in detail previously.

The Embodiment and Method of Use of FIGS. 30–32

FIGS. 30–32 illustrate still another embodiment of the present invention and method of use of the present invention. The wrapping material 10k and sheet of material 12k illustrated in this embodiment and used in this method are constructed exactly the same as the wrapping material 10h and the sheet of material 12h shown in FIG. 21 (wrapping material 10h and sheet of material 12h being exactly like FIGS. 1–2 and described in detail previously, except for the differences described above).

A floral arrangement 32k is disposed upon the sheet of material 12k in the same manner shown in FIGS. 6–11 and described in detail previously for the method of use of wrapping material 10a and the sheet of material 12a, however, it will be appreciated that any method of use shown or described herein may be utilized. The method for wrapping the floral arrangement 32k with the sheet of material 12k, as shown in FIGS. 31 and 32, differs somewhat from the previously described methods, in that the sheet of material 12k is crimped in a manner described in detail and shown previously in FIGS. 26–29, the only difference being that the pull tab 28k has a bonding material 42k at least partially disposed thereon, and the pull tab 28k is wrapped about the crimped portion of the wrapper 70k after the sheet of material 12k has been crimped, thereby further crimping the sheet of material 12k and restricting and retaining the sheet of material 12k in a crimped condition.

The wrapper 70k is caused to be more tightly wrapped about the floral arrangement 32k by grasping the pull tab 28k and pulling the pull tab 28k in a direction (not shown) about the lower end of the wrapper 70k. Once the pull tab 28k has been wrapped tightly about the lower end of the wrapper 70k, the portion of the pull tab 28k having the bonding material 42k applied thereto is engagingly pressed against the wrapper 70k to affix the pull tab 28k to the wrapper 70k thereby causing the lower end of the wrapper 70k to be crimpingly wrapped about the stem portion 36k of the floral arrangement 32k for inhibiting the floral arrangement 32k from slipping or moving within the wrapper 70k.

In an alternative method (not shown), the pull tab 28k is elongated, and may have only a single spot of bonding material 42k thereon, and wraps completely around the wrapper 70k, the spot of bonding material 42k used to attach the pull tab 28k to itself after it is wrapped completely around the wrapper 70k. The pull tab 28k may be wrapped about the already crimped wrapper 70k, or, alternatively, the pull tab 28k may be utilized to both crimp the wrapper 70k in a crimped condition, as described above, as well as retain the wrapper 70k in a crimped condition.

In a further alternative method (not shown), the sheet of material 12k may have a bonding material 42k on the lower surface 16k, and the pull tab 28k may have no bonding material 42k thereon. The sheet of material 12k will then be crimped by any method previously described herein, and the pull tab 28k will extend about the crimped bonding material and will bond thereto, thereby retaining the wrapper 70k in a crimped condition.

The sheet of material 12k is unwrapped from a floral arrangement 32k in exactly the same manner as shown herein and described in detail previously.

Changes may be made in the embodiments of the invention described herein, or in parts or elements of the embodiments described herein, or in the sequence of steps of the methods described herein, without departing from the spirit and/or scope of the invention as defined in the following claims.

What is claimed is:

1. A method for wrapping a floral arrangement, comprising:

providing a floral arrangement;
   providing a sheet of material having
      an upper surface,
      a lower surface,
      a first connecting means disposed on a portion of the sheet of material for connecting portions of the sheet of material to itself during the wrapping step, the first connecting means positioned such that portions of the sheet of material adjacent the floral arrangement can be crimped together about the floral arrangement;
      a second connecting means for further crimpingly connecting portions of the sheet of material about the floral arrangement, the second connecting means comprising a pull tab attached to the sheet of material, the pull tab having a bonding material disposed on a portion thereof, the pull tab acting to crimpingly connect portions of the sheet of material about the floral arrangement;
   placing the floral arrangement on the sheet of material;
   wrapping the sheet of material about the floral arrangement causing a portion of the sheet of material near the first connecting means to overlap another portion of the sheet of material resulting in overlapping portions;
   bonding the overlapping portions of the sheet of material by contacting and connecting the first connecting means to adjacent overlapping portions of the sheet of material whereby the overlapping portions of the sheet of material are bonded together, the sheet of material encompassing and surrounding a portion of the floral arrangement forming a wrapper about the floral arrangement; and
   binding the wrapper to the floral arrangement by crimping portions of the wrapper together causing the first connecting means to engage adjacent portions of the wrapper to crimpingly connecting said portions of the wrapper about the portion of the floral arrangement, and wrapping the second connecting means comprising the pull tab about at least a portion of the wrapper and connecting at least a portion of the pull tab to the wrapper via the bonding material on the pull tab, the pull tab crimpingly connecting at least portions of the wrapper about the floral arrangement, the pull tab assisting in retaining the wrapper in a crimped condition, both first connecting means and second connecting means thereby binding at least portions of the wrapper to the floral arrangement.

2. The method of claim 1 wherein in the step of providing a sheet of material the step further comprises providing a pad of sheets of material, the pad having a top sheet of material and wherein the first connecting means of each sheet of material is bondingly connected to a portion of an adjacent sheet of material for cooperating to connect the sheets of material into the pad.

3. The method of claim 2 wherein the step further comprises the first connecting means on each sheet of material releasably connecting each sheet of material to one other sheet of material whereby one of the sheets of material can be releasably disconnected from another sheet of material by pulling the sheets of material apart.

4. The method of claim 2 wherein in the step of wrapping the top sheet of material about the floral arrangement the step further comprises:
   placing a portion of the top sheet of material over at least a portion of the floral arrangement and rolling the top sheet of material and the floral arrangement and wrapping the top sheet of material about the floral arrangement, the connecting means on the top sheet of material being bondingly connected to another portion of the top sheet of material for securing the top sheet of material in a wrapped position about the floral arrangement and the top sheet of material being removed from the pad of sheets of material as the top sheet of material is wrapped about the floral arrangement.

5. The method of claim 4 wherein in the step of providing a sheet of material, the sheet of material further comprises a first side, a second side, a third side and a fourth side and the connecting means is on the upper surface of each sheet of material near one side of the sheet of material and extending a distance therefrom to the other side, and wherein in the step of wrapping the top sheet of material about the floral arrangement, the step further comprises:
   placing a portion of the top sheet of material near the first side thereof over a portion of the floral arrangement and rolling the top sheet of material and the floral arrangement until the top sheet of material is rolled about the floral arrangement, the connecting means on the top sheet of material bindingly connected to a portion of the top sheet of material as the top sheet of material and the floral arrangement is rolled over the first connecting means and the top sheet of material being disconnected from the pad as the top sheet of material and floral arrangement are rolled over the pad whereby the top sheet of material is lifted from the pad and the bonding connection between the top sheet of material and a next sheet of material is disconnected.

6. The method of claim 5 wherein in the step of wrapping the top sheet of material about the floral arrangement and disconnecting the top sheet of material from the pad the step further comprises leaving the next sheet of material forming a new top sheet of material, and
   wherein the steps of placing the floral arrangement on the top sheet of material, and wrapping the top sheet of material about the floral arrangement are repeated with other floral arrangements until substantially all of the sheets of material in the pad have been wrapped about the floral arrangements.

7. The method of claim 1 wherein in the step of providing a sheet of material, the sheet of material is further defined as constructed from a material selected from the group of materials consisting of paper (treated or untreated), cellophane, foil, polymer film, fabric (natural or synthetic, woven or unwoven), or burlap or combinations thereof.

8. The method of claim 1 wherein in the step of providing a sheet of material, the sheet of material is further defined as having a thickness in a range from less than about 1 mil to about 30 mils.

9. The method of claim 1 wherein in the step of providing the sheet of material having a first connecting means, the first connecting means further comprises a bonding material selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

10. The method of claim 1 wherein in the step of providing a sheet of material, the sheet of material further comprises a pull tab formed integrally with the sheet of material.

11. The method of claim 1 wherein in the step of providing a sheet of material, the sheet of material further comprises a pull tab formed from a separate sheet of material.

12. A method for wrapping a floral arrangement, comprising:

providing a floral arrangement having a bloom portion and a stem portion;

providing a sheet of material having
  an upper surface,
  a lower surface,
  a first connecting means disposed on a portion of the sheet of material for connecting portions of the sheet of material to itself during the wrapping step, the first connecting means positioned such that portions of the sheet of material adjacent the floral arrangement can be crimpingly connected together about a portion of the floral arrangement;
  a second connecting means comprising a pull tab attached to the sheet of material for crimpingly connecting portions of the sheet of material to itself during the wrapping step, the second connecting means enabling portions of the sheet of material adjacent the floral arrangement to be crimpingly connected about a portion of the floral arrangement;

placing the floral arrangement on the sheet of material;

wrapping the sheet of material about the floral arrangement causing a portion of the sheet of material near the first connecting means to overlap another portion of the sheet of material resulting in overlapping portions;

bonding the overlapping portions of the sheet of material by contacting and connecting the first connecting means to adjacent overlapping portions of the sheet of material whereby the overlapping portions of the sheet of material are bonded together, the sheet of material encompassing and surrounding at least a portion of the stem portion of the floral arrangement forming a wrapper about the floral arrangement; and binding the wrapper to the floral arrangement by crimping portions of the wrapper together causing the first connecting means to engage adjacent portions of the wrapper to crimpingly connecting said portions of the wrapper about said portion of the floral arrangement, and wrapping the second connecting means comprising the pull tab about at least a portion of the wrapper, and connecting at least a portion of the pull tab to the wrapper, the pull tab crimpingly connecting at least a portion of the wrapper about at least a portion of the floral arrangement, the pull tab assisting in retaining the wrapper in a crimped condition, both first connecting means and second connecting means thereby binding at least portions of the wrapper to the floral arrangement.

13. The method of claim 12 wherein in the step of providing a sheet of material, the step further comprises providing a pad of sheets of material, the pad having a top sheet of material and wherein the first connecting means of each sheet of material is bondingly connected to a portion of an adjacent sheet of material for cooperating to connect the sheets of material into the pad.

14. The method of claim 13 wherein in the step of providing a sheet of material, the first connecting means on each sheet of material is further defined as releasably connecting each sheet of material to one other sheet of material whereby one of the sheets of material can be releasably disconnected from another sheet of material by pulling the sheets of material apart.

15. The method of claim 13 wherein the step of wrapping the top sheet of material about the floral arrangement, the step further comprises:

placing a portion of the top sheet of material over at least a portion of the floral arrangement and rolling the top sheet of material and the floral arrangement and wrapping the top sheet of material about the floral arrangement, the connecting means on the top sheet of material being bondingly connected to another portion of the top sheet of material for securing the top sheet of material in a wrapped position about the floral arrangement and the top sheet of material being removed from the pad of sheets of material as the top sheet of material is wrapped about the floral arrangement.

16. The method of claim 15 wherein in the step of providing a sheet of material, the sheet of material further comprises a first side, a second side, a third side and a fourth side and the connecting means is on the upper surface of each sheet of material near one side of the sheet of material and extending a distance therefrom to the other side, and wherein the step of wrapping the top sheet of material about the floral arrangement further comprises:

placing a portion of the top sheet of material near the first side thereof over a portion of the floral arrangement and rolling the top sheet of material and the floral arrangement until the top sheet of material is rolled about the floral arrangement, the connecting means on the top sheet of material bindingly connected to a portion of the top sheet of material as the top sheet of material and the floral arrangement is rolled over the first connecting means and the top sheet of material being disconnected from the pad as the top sheet of material and floral arrangement are rolled over the pad whereby the top sheet of material is lifted from the pad and the bonding connection between the top sheet of material and a next sheet of material is disconnected.

17. The method of claim 16 wherein the step further comprises, after wrapping the top sheet of material about the floral arrangement and disconnecting the top sheet of material from the pad leaving the next sheet of material to form a new top sheet of material, and wherein the steps of placing the floral arrangement on the top sheet of material, and wrapping the top sheet of material about the floral arrangement are repeated with other floral arrangements until substantially all of the sheets of material in the pad have been wrapped about the floral arrangements.

18. The method of claim 12 wherein in the step of providing a sheet of material, the sheet of material is further defined as constructed from a material selected from the group of materials consisting of paper (treated or untreated), cellophane, foil, polymer film, fabric (natural or synthetic, woven or unwoven), or burlap or combinations thereof.

19. The method of claim 12 wherein in the step of providing a sheet of material, the sheet of material is further defined as having a thickness in a range from less than about 1 mil to about 30 mils.

20. The method of claim 12 wherein in the step of providing the sheet of material having a first connecting means, the first connecting means further comprises a bonding material selected from the group consisting of a pressure sensitive adhesive or cohesive, a heat sensitive adhesive or cohesive, a sonically sealable adhesive or cohesive, a vibratingly sealing adhesive or cohesive, or a chemically sealing adhesive or cohesive.

21. The method of claim 1 wherein in the step of providing the sheet of material, the sheet of material further comprises a pull tab having a bonding material disposed on a portion thereof.

22. The method of claim 12 wherein in the step of providing a sheet of material, the sheet of material further comprises a pull tab formed integrally with the sheet of material.

23. The method of claim 12 wherein in the step of providing a sheet of material, the sheet of material further comprises a pull tab formed from a separate sheet of material.

24. A method for wrapping a floral arrangement, comprising the steps of:

provinding a floral arrangement having a flower portion and a stem portion;

providing a sheet of material having a connecting means disposed on at least a portion of the sheet of material;

placing the floral arrangement on the sheet of material;

wrapping the sheet of material about the floral arrangement thereby forming a wrapper about the floral arrangement with the wrapper extending about at least a portion of the stem portion of the floral arrangement; and crimping portions of the wrapper together about the stem portion of the floral arrangement and causing the connecting means to engage portions of the wrapper for holding the wrapper in a crimped condition about the stem portion of the floral arrangement.

25. A method for wrapping a floral arrangement, comprising the steps of:

providing a floral arrangement having a flower portion and a stem portion;

providing a sheet of material;

providing at least one connecting means;

disposing the connecting means on at least a portion of the sheet of material;

placing the floral arrangement on the sheet of material;

wrapping the sheet of material about the floral arrangement thereby forming a wrapper about the floral arrangement with the wrapper extending about at least a portion of the stem portion of the floral arrangement; and crimping portions of the wrapper together about the stem portion of the floral arrangement and causing the connecting means to engage portions of the wrapper for holding the wrapper in a crimped condition about the stem portion of the floral arrangement.

26. A method for wrapping a floral arrangement, comprising the steps of:

providing a floral arrangement having a flower portion and a stem portion;

providing a sheet of material;

providing at least one connecting means;

placing the floral arrangement on the sheet of material;

wrapping the sheet of material about the floral arrangement thereby forming a wrapper about the floral arrangement with the wrapper extending about at least a portion of the stem portion of the floral arrangement;

disposing the connecting means on at least a portion of the wrapper; and crimping portions of the wrapper together about the stem portion of the floral arrangement and causing the connecting means to engage portions of the wrapper for holding the wrapper in a crimped condition about the stem portion of the floral arrangement.

* * * * *